United States Patent [19]
Fujita

[11] Patent Number: 5,491,582
[45] Date of Patent: Feb. 13, 1996

[54] LIGHT-RECEIVING MODULE

[75] Inventor: Masayuki Fujita, Tokyo, Japan

[73] Assignee: NEC Corporation, Japan

[21] Appl. No.: 227,578

[22] Filed: Apr. 14, 1994

Related U.S. Application Data

[63] Continuation of Ser. No. 936,934, Aug. 28, 1992, abandoned.

[30] Foreign Application Priority Data

Aug. 29, 1991 [JP] Japan .................................... 3-218491

[51] Int. Cl.$^6$ ................................ H01S 3/10; G02B 6/32
[52] U.S. Cl. ........................ 359/341; 359/234; 359/581
[58] Field of Search .......................... 359/200, 234–236, 359/337, 341, 581, 889; 385/1; 372/5, 20

[56] References Cited

U.S. PATENT DOCUMENTS

| | | | |
|---|---|---|---|
| 4,064,535 | 12/1977 | Cross et al. | 359/884 |
| 4,770,478 | 9/1988 | Cross et al. | 359/884 |
| 4,813,756 | 3/1989 | Frenkel et al. | 359/589 |

FOREIGN PATENT DOCUMENTS 2175766  12/1986  United Kingdom.

OTHER PUBLICATIONS

IEEE Photonics Technology Letters, vol. 2, No. 10, Oct. 1990, New York, pp. 753–755, R. C. Steele & G. R. Walker, "High–Sensitivity FSK Signal Detection Wtih An Erbium–Doped Fiber Preamplifier and Fabry–Perot Etalon Demodulation".

IEEE Photonics Technology Letters, vol. 2, No. 9, Sep. 1990, New York, pp. 669–672, Willner et al., "Use Of LD–Pumped Erbium–Doped Fiber Preamplifiers With Optimal Noise Filtering In A FDMA–FSK 1 Gb/s Star Network".

Patent Abstracts of Japan, vol. 13, No. 276 (P–890) Mar. 13, 1989, JP–A–10 66 526 (A T R Koudenpa Tsushin Kenkyusho).

Patent Abstracts of Japan, vol. 6, No. 013 (P–099) Oct. 29, 1981, JP–A–56 138 707 (Fujitsu Ltd.).

*Primary Examiner*—Nelson Moskowitz
*Attorney, Agent, or Firm*—Ostrolenk, Faber, Gerb & Soffen

[57] ABSTRACT

A light-receiving module having the characteristics of a tunable bandpass filter and applicable for receiving light signal from an optic fiber in the field of optical communication or optical information processing. The light-receiving module is coupled to the optical fiber and has a photo-detecting device for converting a light signal into an electric signal, a lens optically coupling said optical fiber and said photo-detecting device, and a bandpass filter plate provided between the photo-detecting device and the lens. The bandpass filter plate is supported such that it may rotate around an axis which is parallel to the face of the plate.

15 Claims, 6 Drawing Sheets

5,491,582

LIGHT-RECEIVING MODULE

This is a continuation of application Ser. No. 07/936,934 filed on Aug. 28, 1992, now abandoned.

BACKGROUND OF THE INVENTION

1. Field of the Invention

The present invention relates to a light-receiving module for use in the field of optical communication or optical information processing for receiving signal light from an optical fiber, and in particular, to a light-receiving module for receiving signal light amplified by a fiber optic amplifier.

2. Description of the Related Art

Light-receiving modules are provided at the end of optical fibers for receiving and converting signal light from the optical fibers into electric signals. A light-receiving module of the conventional type is composed of a lens 53 and photo-detecting device 51 and is housed in a case 50 as shown in FIG. 1. An avalanche photo diode (APD) or a pin photo diode is used for the photo-detecting device 51, which converts a light signal into an electric signal. The photo-detecting device 51 is optically coupled with optical fiber 52 through lens 53 in such a manner that light coming into the light-receiving module from optical fiber 52 will reach photo-detecting device 51.

When light signals are transmitted through the optical fiber, the intensity of the light signals attenuates in proportion to the distance transmitted due to transmission losses of the optical fiber. In order to overcome this problem in fiber optic communication systems now in use, repeaters are provided at fixed intervals for amplifying attenuated light signals. However, since repeaters are constructed so as to convert light signals into electric signals, amplify the electric signals and then convert them back into light signals for transmission, conventional repeaters are inevitably large-scale and expensive.

In order to solve these problems, recent research by technicians involved in optical amplification has resulted in the development of systems utilizing rare-earth doped fibers. Optical amplification is a method in which incident signal light is amplified in a light state for obtaining outgoing signal light without converting light signals into electric signals. In optical amplification using rare-earth doped fibers, rare-earth cations in the fiber are excited in advance by laser light of a wavelength in a range other than that of the signal light. In this manner, stimulated emission by the signal light occurs, thereby achieving light amplification. For example, an optical amplifier using an optical fiber doped with Neodymium (Nd) or Erbium (Er) is disclosed in the specification of British Patent GB 2,175,766A. An optical amplifier of this type will be hereinafter referred to as a fiber optic amplifier.

When a fiber optic amplifier is used, particularly as a preamplifier in a receiving station, it is necessary to reduce noise by removing spontaneous emission light emitted by rare-earth doped fibers. For this purpose, it is necessary to insert a bandpass filter of a narrow bandwidth which transmits only signal light to the emission side of the fiber optic amplifier. In FIG. 2, the structure of an example receiving station using a fiber optic communication system is shown which includes a fiber optic amplifier.

The fiber optic amplifier 60 is composed of a rare-earth doped fiber 54, a semiconductor laser module 55 which serves as a light source for exciting rare-earth ions in the rare-earth doped fiber 54, a coupler 56 provided in the incident side of the rare-earth doped fiber 54, and a fiber-type bandpass filter 58 provided at the emission side of the rare-earth doped fiber 54. The coupler 56 is used for transmitting both signal light from the optical fiber 59 coupled to the transmitting station and excitation light from the semiconductor laser module 55 into the rare-earth doped fiber 54. The emission side of the rare-earth doped fiber 54 is coupled to the optical fiber 52 by way of the bandpass filter 58, and the light-receiving module 57 is coupled with the other end of the optical fiber 52. Since the bandpass filter 58 has to transmit only the wavelength of a specific signal light and reduce other spontaneous emission light to a minimum, it must allow setting of its bandwidth of transmission wavelength to as narrow a range as possible (not more than several nanometers) with a highly precise center wavelength of transmission (not more than several tenths of a nanometer).

The structure of an example fiber-type bandpass filter 58 to be inserted into an optic transmission line is shown in FIG. 3. This bandpass filter 58 comprises two lenses 61, 62 which optically couple a rare-earth doped fiber 54 and an optical fiber 52 connected to the receiving side, and a bandpass filter plate 63 which transmits only a specific wavelength provided in the optical path of both lenses 61, 62. The bandpass filter plate 63 used is made by forming a dielectric multilayer film on the surface of a glass plate. The transmission center wavelength is usually set by adjusting the angle of incidence of light entering the bandpass filter plate 63.

For this bandpass filter 58, it is necessary that the two optical fibers 52 and 54 typically having cores 10 μm in diameter be coupled in an optically efficient manner while the incident angle of light entering the bandpass filter plate 63 is adjusted, and it is therefore difficult to match the optic axes of the two optical fibers. Coupling losses due to the two lenses 61, 62 in the bandpass filter 58 cannot be disregarded, if an overall light amplification gain of the fiber optic amplifier 60 is to be achieved.

The bandpass filter 58 allows the center wavelength of transmission to be changed at will by changing the incident angle of incoming light by rotating the bandpass filter plate 63. However, since light enters the bandpass filter plate 63 at an oblique angle, the transmitted light beam shifts in a parallel direction due to the difference of refractive index between the bandpass filter plate 63 and air. In a system in which the optical fibers 52, 54 are mutually coupled, dimensional tolerance for parallel movement of the transmitted beam through the bandpass filter plate 63 is strictly set, and when the transmission center wavelength is changed by rotating the bandpass filter plate 63 after fixing each of the lenses 61, 62 and optical fibers 52, 54, coupling losses between the optical fibers 52, 54 will increase. It is consequently impossible to construct a tunable bandpass filter by using a fiber-type bandpass filter of this kind.

Due to the factors described above, it has been found that a structure in which a bandpass filter is provided at the emission side of a fiber optic amplifier and in which the bandpass filter and light-receiving module are further coupled by means of another optical fiber, gain of the fiber optic amplifier is substantially reduced and it is difficult to produce a tunable bandpass filter.

SUMMARY OF THE INVENTION

An object of the present invention is to provide a light-receiving module which has the characteristics of a bandpass filter, but which can adjust the center wavelength of transmission without reducing the light-receiving sensitivity and which can prevent loss in overall light amplification gain between the input part of a fiber optic amplifier and a photo-detecting device when the light-receiving module is coupled with the fiber optic amplifier.

This object of the present invention is achieved by providing a light-receiving module which is coupled to an optical fiber and which has a photo-detecting device for converting a light signal into an electric signal and a lens optically coupling said optical fiber and said photo-detecting device which comprises a bandpass filter plate provided between the photo-detecting device and the lens and supported such that it may rotate around an axis which is parallel to its face.

The above and other objects, features and advantages of the present invention will become apparent from the following description referring to the accompanying drawings which illustrate an example of a preferred embodiment of the present invention.

DETAILED DESCRIPTION OF THE PREFERRED EMBODIMENT

Figure 4:
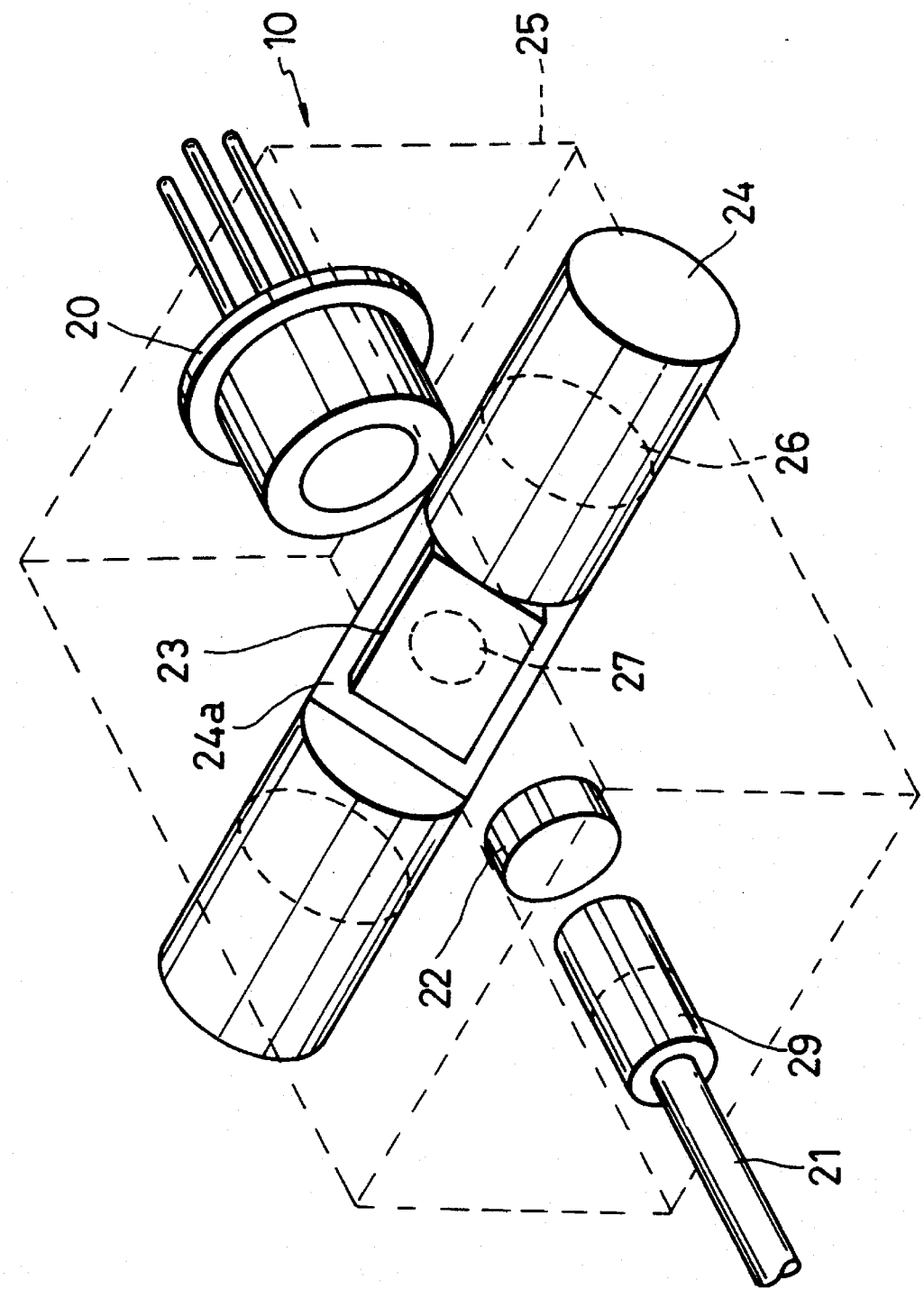
FIG. 4 is a perspective view showing the structure of the light-receiving module according to an embodiment of the present invention.
Figure 5:
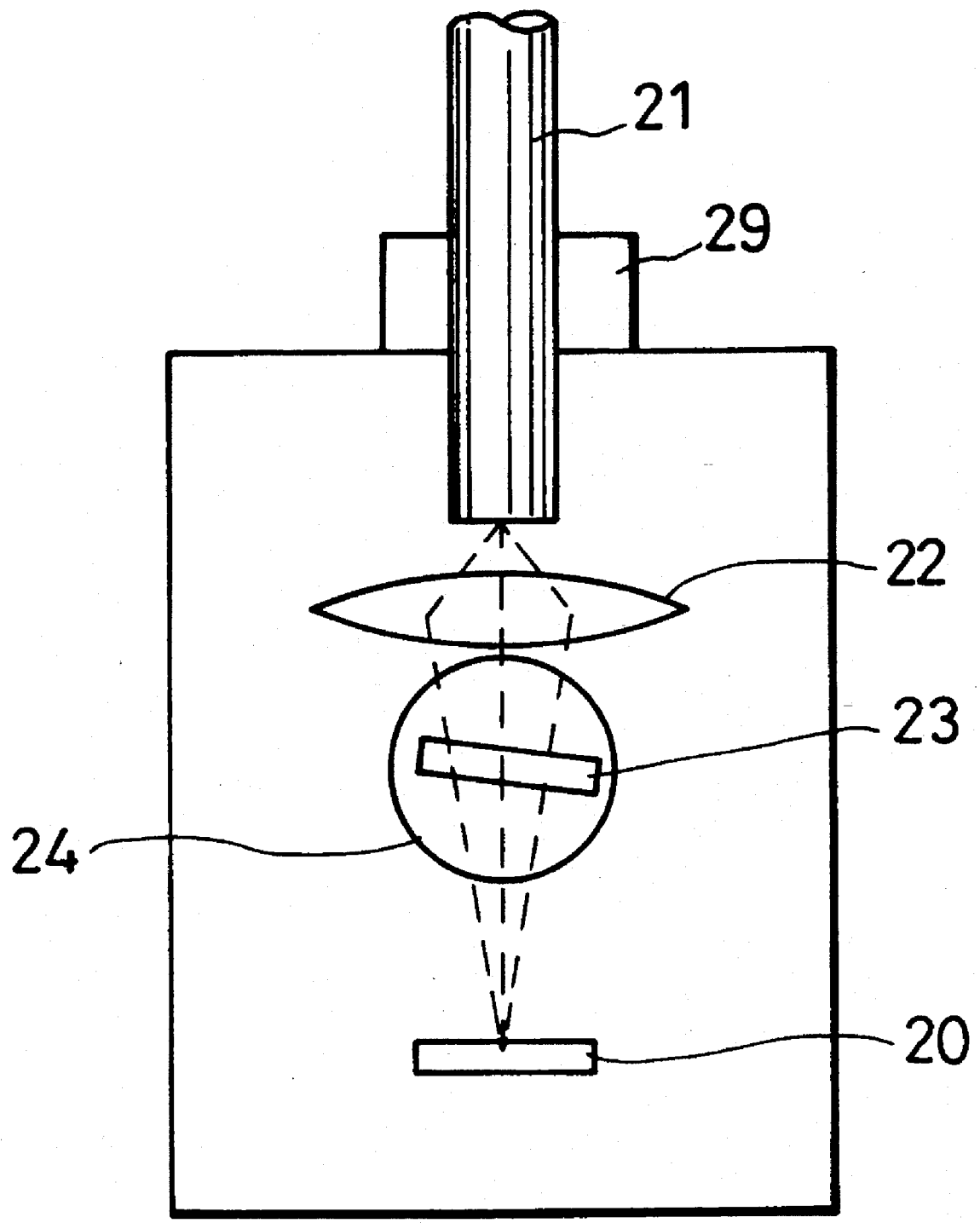
FIG. 5 is a diagrammatic view showing the relation between the structure and the optical path of the light-receiving module shown in FIG. 4.

A preferred embodiment of the present invention will be described with reference to the attached drawings. Light-receiving module 10 of the present embodiment comprises, as shown in FIG. 4 and FIG. 5, a rectangular parallelepiped case 25, a photo-detecting device 20 attached to the case 25, a receptacle 29 for receiving an optical fiber 21, a lens 22, a rotary holder 24 attached to the case 25 in such a manner as to allow rotation, and a bandpass filter plate 23 attached to the rotary holder 24. Photo-detecting device 20 converts light signals into electric signals and consists of, for example, an avalanche photo diode or a pin photo diode. The receptacle 29 is attached to the face of the case 25 opposite the face to which the photo-detecting device 20 is attached in such a manner that the end of the optical fiber 21 which is received by the receptacle 29 faces the photo-detecting device 20. The lens 22 is provided on the optical path leading from the optical fiber 21 to the photo-detecting device 20. The lens 22 functions to optically and efficiently couple the optical fiber 21 and the photo-detecting device 20.

Figure 6:
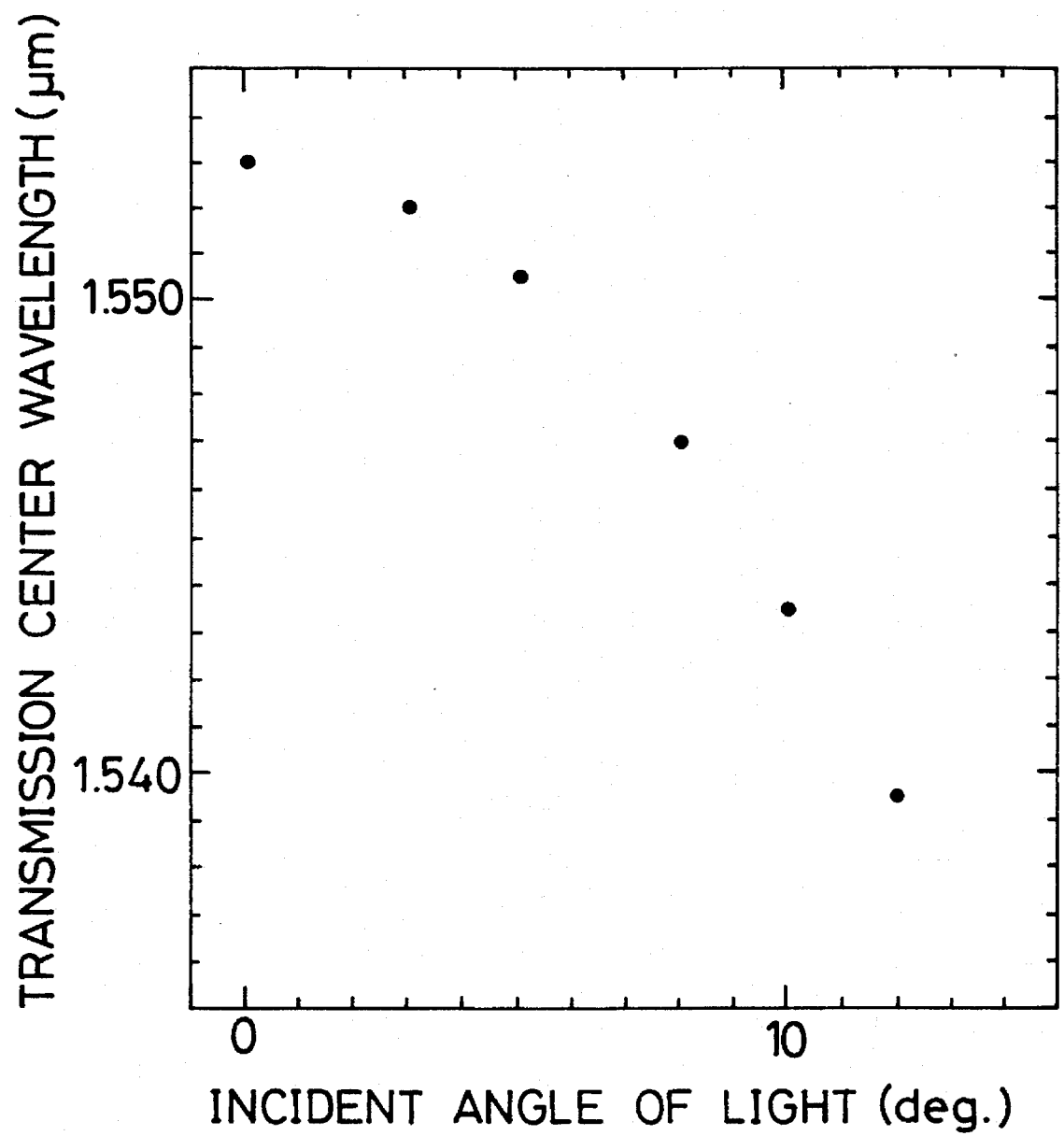
FIG. 6 is a characteristic graph showing the relation between the incident angle and transmission center wavelength in the bandpass filter plate.

The rotary holder 24 is a bar-shaped member with its axis of rotation substantially perpendicular to the optical path from the optical fiber 21 to the photo-detecting device 20. The rotary holder 24 is provided with a bearing part 26 which allows rotation and which is provided in a side wall of the case 25. A constricted part 24a having a penetration hole 27 provided in the direction perpendicular to the rotation axis thereof is formed in the middle of the long side of the rotary holder 24. The optical path from the optical fiber 21 to the photo-detecting device 20 is arranged so as to pass through the penetration hole 27. The bandpass filter plate 23 is attached to the rotary holder 24 in such a way as to cover this penetration hole 27. The bandpass filter plate 23 is made by depositing a plurality of dielectric films in a plurality of layers on a glass substrate 0.5 mm thick and transmits only light at a specific wavelength. In this embodiment, the dielectric multilayered film consists of a stack of alternate thin layers of titanium dioxide ($TiO_2$) and silicon dioxide ($SiO_2$). The relation between the incident angle of light entering the bandpass filter plate 23 and the transmission center wavelengths is shown in FIG. 6.

By constructing the light-receiving module 10 as described above, light emitted from the end part of the optical fiber 21 received in the receptacle 29 reaches the bandpass filter plate 23 through the lens 22, and light at specific wavelengths is then selected to reach the photo-detecting device 20. Since the bandpass filter plate 23 is attached to the rotary holder 24 in such a manner as to allow rotation and is supported on the case 25, the incident angle of light emitted from the lens 22 and entering the bandpass filter plate 23 can be changed by adjusting rotation angle of the rotary holder 24. Consequently, it is possible to set the transmission center wavelength at the bandpass filter plate 23 by adjusting the bandpass filter plate 23. Although the optical axis of the beam which passes through the bandpass filter plate 23 shifts several tens of μm in a parallel direction in relation to the angle of rotation of the filter plate 23, the light-receiving area of photo-detecting device 20 is generally as large as approximately 50 to 100 μm square, and the light-receiving sensitivity of the photo-detecting device 20 therefore scarcely changes due to parallel movement of the beam. Therefore, the transmission center wavelength of the bandpass filter plate 23 can be adjusted without reducing the light-receiving sensitivity of the photo-detecting device 20. Further, since the light-receiving area of photo-detecting device 20 is large, matching of optical axes can be easily performed.

Figure 7:
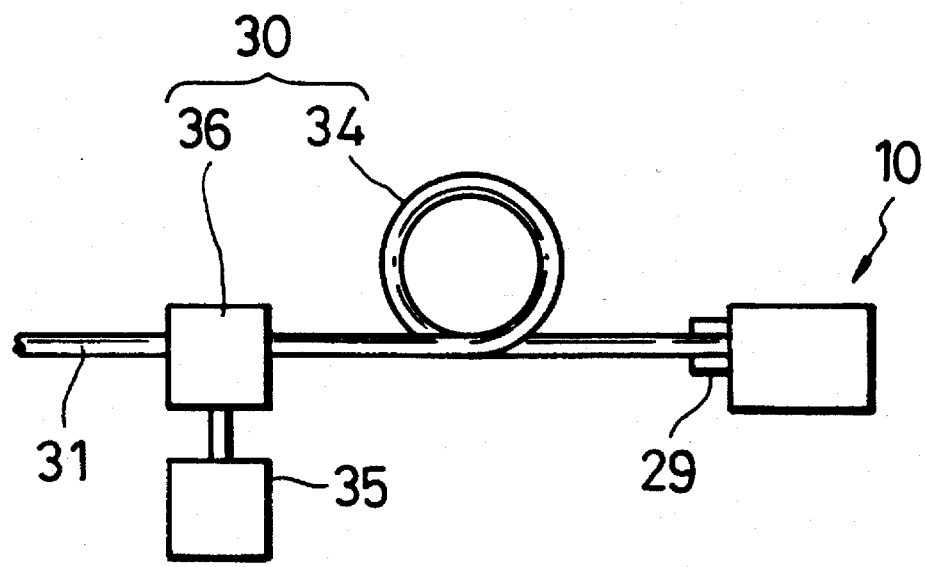
FIG. 7 is a block diagram showing an example in which a fiber optic amplifier and the light-receiving module of the present embodiment are associated.

An example of the light-receiving module of the present embodiment applied to a fiber optic communication system will now be described. In FIG. 7, the light-receiving module 10 described above is directly coupled to a fiber optic amplifier 30. The fiber optic amplifier 30 is composed of a rare-earth doped fiber 34, a semiconductor laser module 35 which serves as a light source for exciting rare-earth ions in the rare-earth doped fiber 34, and a coupler 36 provided at the incident side of the rare-earth doped fiber 34. The coupler 36 is used for transmitting both signal light from the optical fiber 31 coupled to the transmitting station and excitation light from the semiconductor laser module 35 into the rare-earth doped fiber 34. The emission end of the rare-earth doped fiber 34 is received in the receptacle 29 of the light-receiving module 10. In this fiber optic communication system, signal light from the optical fiber 31 is inputted into the light-receiving module 10 after it is amplified by the fiber optic amplifier 30. Though amplified signal light and excitation light for the rare-earth doped fiber 34 or spontaneous emission light in the rare-earth doped fiber 34 together enter the light-receiving module 10, this excitation light and spontaneous emission light are removed by the bandpass filter plate in the light-receiving module 10, and only amplified signal light reaches the photo-detecting device. Since a fiber-type bandpass filter of the conventional type is not used, the overall gain in light amplification of a system which includes a fiber optic amplifier and a light-receiving module does not decrease. Further, since fine adjustment of the transmission center wavelength can be easily performed, it is possible to deal with minute variations in the wavelength of the signal light as well as to more precisely select only the signal light from the transmitting station.

Figure 1:
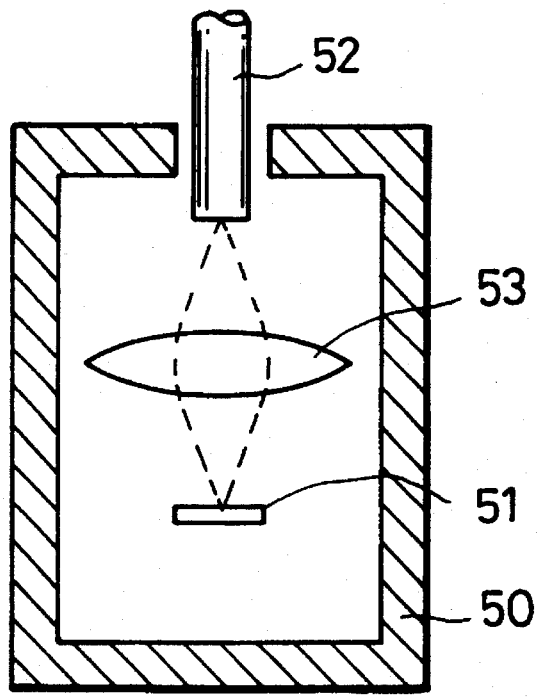
FIG. 1 is a diagrammatic sectional view showing the structure of a light-receiving module of the conventional type.
Figure 2:
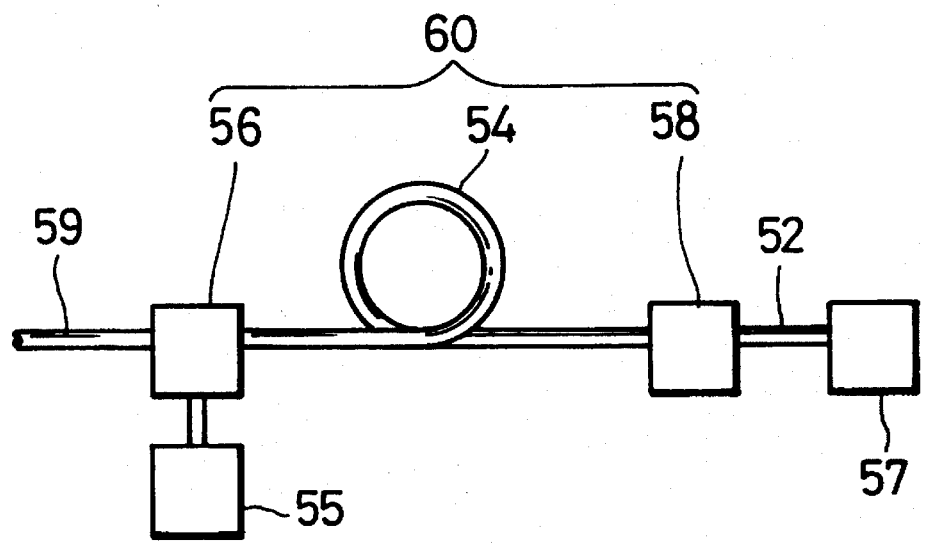
FIG. 2 is a block diagram showing the structure of an example of a fiber optic communication system using the light-receiving module shown in FIG. 1.
Figure 3:
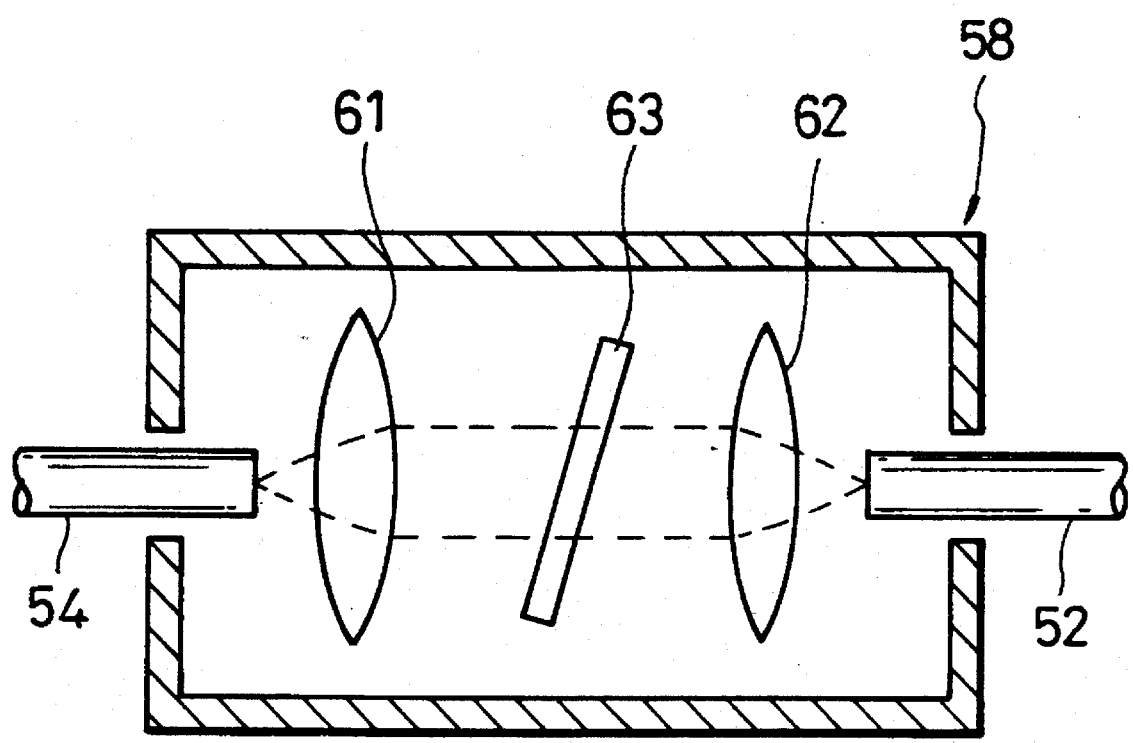
FIG. 3 is a diagrammatic sectional view showing the structure of a bandpass filter of the conventional type.
Figure 8:
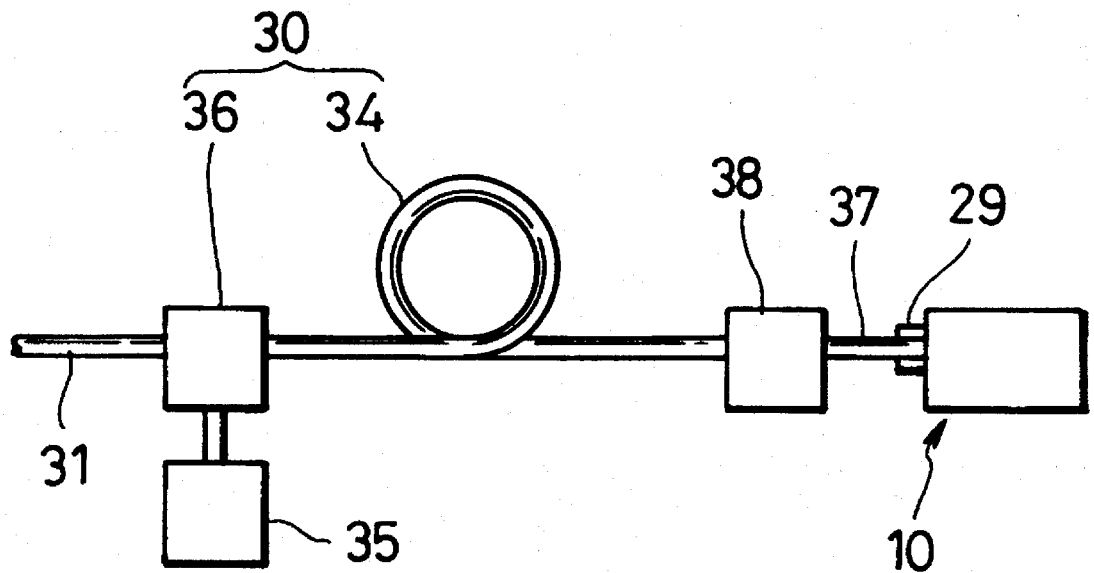
FIG. 8 is a block diagram showing another example in which a fiber optic amplifier and the light-receiving module of the present embodiment are associated.

As shown in FIG. 8, the light-receiving module 10 of the present embodiment can also be coupled with a fiber optic amplifier 30 through an optical fiber 37. The emission side of the rare-earth doped fiber 34 of the fiber optic amplifier 30 and one end of the optical fiber 37 are coupled by means of a light connector 38, and the other end of the optical fiber 37 is received in the receptacle 29 of the light-receiving module 10. The length of the optical fiber 37 is determined according to the light amplification gain of the fiber optic amplifier 30 and the light-receiving sensitivity of the light-receiving module 10, and it is possible to obtain a fiber 37 which is as long as a common optical fiber relay distance. In this case also, amplified light and excitation light or spontaneous emission light together enter the optical fiber 37 from the rare-earth doped fiber 34, and from the optical fiber 37 signal light and spontaneous emission light then enter the light-receiving module 10. However, as described earlier, all of the light is filtered by the bandpass filter plate of the light-receiving module 10 and only the objective signal light is inputted into the photo-detecting device. The transmission loss of this fiber optic communication system is reduced by a lesser extent than that of the similar conventional system shown in FIG. 2. The loss is equivalent to a structure which has no fiber-type bandpass filter, thereby enabling a proportionately longer optical fiber coupling the fiber optic amplifier and the light-receiving module. Further, with the present communication system, fine adjustment of the transmission center wavelengths can be easily carried out to allow response to minute variations in the signal light wavelength.

It is to be understood that variations and modifications of the light-receiving module disclosed herein will be evident to those skilled in the art. It is intended that all such modifications and variations be included within the scope of the appended claims.

What is claimed is:

1. A light-receiving module which is coupled to an optical fiber and receiving a light signal amplified by a fiber optic amplifier, comprising;

a photo-detecting device for converting a light signal into an electric signal;

a lens optically coupling one end of an optical fiber and said photo-detecting device; and a bandpass filter plate provided between said photo-detecting device and said lens, without any other component between said photo-detecting device and said bandpass filter plate, said bandpass filter plate being supported by a means effective for enabling said bandpass filter to be rotated around an axis which is parallel to its face to thereby enable adjusting a center of wavelength of transmission without reducing a light receiving sensitivity associated with transmission of light from said optical fiber to said photo-detecting device, wherein a light signal amplified by a fiber optic amplifier is emitted from said end of said fiber to said lens.

2. A light-receiving module according to claim 1, in which said bandpass filter plate comprises a glass substrate and a dielectric multilayer film on said glass substrate.

3. A light-receiving module according to claim 2, in which said dielectric multilayer film is made of alternately laminated thin films of titanium dioxide and silicon dioxide.

4. A light-receiving module according to claim 2, in which the center axis of rotation of said bandpass filter plate is substantially perpendicular to an optical path leading from said lens to said photo-detecting device.

5. A light-receiving module according to claim 4, in which a photo-detecting device consists of an avalanche photo diode.

6. A light-receiving module according to claim 4, in which a photo-detecting device consists of a pin photo diode.

7. A light-receiving module according to claim 2, in which said light-receiving module is coupled with a fiber optic amplifier.

8. A light-receiving module according to claim 2, in which said optical fiber is an optical fiber which is used for light amplification in a fiber optic amplifier.

9. A light-receiving module according to claim 8, in which said optical fiber for light amplification is a rare-earth doped fiber.

10. A light-receiving module according to claim 1, further comprising:

a case, said photo-detecting device, lens and bandpass filter plate being arranged inside said case;

a receptacle attached to said case for receiving said optical fiber; and a rotary holder inside said case and rotatably attached to said case, said bandpass filter plate being supported by said rotary holder so as to be rotatable around said axis.

11. A light-receiving module according to claim 10, wherein said case comprises opposing faces, said receptacle being attached to one face of said case opposite an opposing face to which said photo-detecting device is attached, said photo-detecting device facing one end of said optical fiber received in said receptacle.

12. A light-receiving module according to claim 10, wherein said rotary holder is a bar-shaped member, said bar-shaped member rotating around said axis substantially perpendicular to an optical path extending from said optical fiber to said photo-detecting device;

means for rotation attached to said bar-shaped member to make said bar-shaped member rotatable about said axis of rotation; and a hole formed in said bar-shaped member for supporting said bandpass filter plate therein and said optical path passing through said hole in said bar-shaped member.

13. A light-receiving module according to claim 1, wherein said light signal comprises a beam having an optical axis, said beam passing through said bandpass filter plate and said optical axis of said beam shifting by a given distance in a direction parallel to itself when said bandpass filter is rotated around said axis of rotation; said photo-detecting means having a light-receiving area substantially larger than said given distance by which said optical axis of said beam is shifted.

14. A light-receiving module according to claim 13, wherein said given distance by which said optical axis of said beam is shifted is several tens of μm and said light-receiving area of said photo-detecting means is 50 to 100 μm square.

15. Light-receiving apparatus, comprising;

an optical fiber amplifier for amplifying an input light signal;

an optical fiber having a first end coupled to said fiber optic amplifier;

a photo-detecting device for converting a light signal into an electric signal;

a lens optically coupling a second end of said optical fiber to said photo-detecting device; and a bandpass filter plate provided between said photo-detecting device and said lens without any other component between said photo-detecting device and bandpass filter plate, said bandpass filter plate being supported by a means effective for enabling said bandpass filter to be rotated around an axis which is parallel to its face, to thereby enable adjusting a center of wavelength of transmission without reducing a light receiving sensitivity associated with transmission of light from said optical fiber to said photo-detecting device, wherein the light signal amplified by a fiber optic amplifier is emitted from said end of said optical fiber to said lens.

* * * * *